United States Patent [19]
Hanna et al.

[11] Patent Number: 5,723,574
[45] Date of Patent: Mar. 3, 1998

[54] REMOVAL OF CATALYST RESIDUES FROM POLYKETONE COMPOSITIONS

[75] Inventors: Paul K. Hanna, East Windsor, N.J.; Andrzej M. Piotrowski, Peekskill, N.Y.

[73] Assignee: Akzo Nobel NV, Netherlands

[21] Appl. No.: 785,644

[22] Filed: Oct. 31, 1991

Related U.S. Application Data

[63] Continuation-in-part of Ser. No. 602,533, Oct. 24, 1990, abandoned.

[51] Int. Cl.$^6$ .................................................. C08G 67/02
[52] U.S. Cl. .................................................. 528/493; 528/392
[58] Field of Search .................................. 528/493, 392

[56] References Cited

U.S. PATENT DOCUMENTS

| | | | |
|---|---|---|---|
| 4,798,884 | 1/1989 | Brons et al. | 528/491 |
| 4,855,400 | 8/1989 | Van Broekhoven et al. | 528/392 |
| 4,960,865 | 10/1990 | Blytas et al. | 528/499 |

OTHER PUBLICATIONS

Hackh's Chemical Dictionary, Fourth Edition, 1980, pp. 8, 16.

*Primary Examiner*—James J. Seidleck
*Attorney, Agent, or Firm*—Richard P. Fennelly; Louis A. Morris

[57] ABSTRACT

Catalyst residues are removed from polyketone compositions by use of a beta diketone compound, e.g., an acetylacetone reagent.

2 Claims, No Drawings

REMOVAL OF CATALYST RESIDUES FROM POLYKETONE COMPOSITIONS

This is a continuation-in-part of U.S. Ser. No. 602,533, filed Oct. 24, 1990.now abandoned.

BACKGROUND OF THE INVENTION

Various techniques have been advocated to remove catalyst residues from polyketone compositions. For example, U.S. Pat. No. 4,786,716 to J. A. M. van Broekhoven et al. advocates the use of a bidentate phosphine ligand to accomplish such a result. U.S. Pat. No. 4,855,400 to J. A. M. van Broekhoven et al. indicates a variety of "complexing agents" for use in removing palladium residues from such polymers and names "acetylacetonates" as one such treatment agent. The use of an acetylacetonate complexing agent with polyketone polymers containing palladium bonded to the polymer, e.g., at the end of the polymer chain, will give rise to a complex between the acetylacetonate and the palladium when the latter is still bonded to the polymer chain. The palladium metal is not removed from the polymer itself.

SUMMARY OF THE INVENTION

The present invention relies upon a beta diketone reagent to effect the removal of catalyst residues from polyketone compositions.

DETAILED DESCRIPTION OF THE INVENTION

U.S. Pat. No. 4,786,716, which is incorporated herein by reference, is illustrative of the type of polyketone systems to which the present invention is applicable.

In accordance with the present invention a beta diketone reagent having the general formula

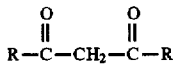

where R is an unsubstituted or substituted lower alkyl group can be used. Examples of unsubstituted alkyl groups include methyl and ethyl. Substituted alkyl groups include halomethyl such as trifluoro. Generally speaking, the process for removal of undesired Group VIII metal residue from the polyketone comprises suspending the polyketone in either the beta diketone (if liquid) alone or in an organic solvent along with the beta diketone so as to use an effective amount (from about 1 to about 25%, by weight based on the weight of the polymer in the solution) of the beta diketone compound.

The use of a beta diketone compound, rather than an acetylacetonate anion, as suggested by U.S. Pat. No. 4,855,400, gives rise to certain significant differences. In cases in which palladium, for example, is bonded to a polyketone polymer, the use of the beta diketone compound having two acidic hydrogens, first breaks the palladium to carbon bond abstracting the metal from the polyketone with the generation of an acetylacetonate moiety, for example. (It is known that beta ketone compounds, having two acidic protons on the CH$_2$ bridging group between the two carbonyl moieties break bonds between palladium and other atoms, such as oxygen, carbon, and the like (see Comprehensive Organometallic Chemistry, G. Wilkinson et al., eds., Vol. 6, 1982, p. 330, equation for compound 194 reacted to form compound 196). This species then complexes with the palladium metal in solution. The net result is a two step sequence in which the undesired metal atom is abstracted from the polymer chain and then complexed.

The Examples which follow further illustrate the invention.

EXAMPLES 1–8

In the Experiments 1–8 CO/C$_2$H$_4$ copolymer samples (Pd content 460 ppm) were suspended in a reagent or a mixture of reagent and a diluent. After stirring at elevated temperature, polymer was separated by filtration, washed with acetone and analyzed. The reaction conditions are listed below. The results of Pd analysis are listed in Table 1.

| Example No. | Time (min) | Temp. (°C) | Reagent Amount (mL) | Diluent Amount (mL) |
|---|---|---|---|---|
| 1 | 5 | 120 | A (15) | — |
| 2 | 15 | 120 | A (15) | — |
| 3 | 15 | 120 | A (7.5) | xylene (7.5) |
| 4 | 15 | 120 | A (1.5) | xylene (12.0) |
| 5 | 15 | 70 | A (7.5) | Isopropanol (7.5) |
| 6 | 15 | 70 | A (1.5) | Isopropanol (12.0) |
| 7 | 15 | 120 | B (15) | — |
| 8 | 60 | 85 | C (7.5) | xylene (7.5) |

Reagents:
A - acetylacetone
B - ethyl acetoacetate
C - 1,1,1,5,5,5,-hexafluoroacetylacetone

TABLE 1

| Example No. | Pd Content (ppm) |
|---|---|
| 1 | 300 |
| 2 | 48 |
| 3 | 50 |
| 4 | 180 |
| 5 | 310 |
| 6 | 460 |
| 7 | 90 |
| 8 | 280 |
| not treated polymer | 460 |

The foregoing Examples have been presented for illustrative purposes only and should not be construed in a limiting sense for that reason. The scope of protection sought is set forth in the claims which follow.

We claim:

1. A process for the removal of Group VIII metal catalyst residues from a carbon monoxide-olefin polyketone copolymer which comprises contacting the polyketone with an effective amount of a beta diketone compound of the formula

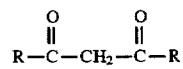

where R is selected from the group consisting of halo substituted methyl and halo substituted ethyl.

2. A process as claimed in claim 1 wherein each R is trifluoromethyl.

* * * * *